US011383609B2

(12) United States Patent
Ulrich et al.

(10) Patent No.: US 11,383,609 B2
(45) Date of Patent: Jul. 12, 2022

(54) METHOD FOR OPERATING AN ELECTRIC CHARGING CONTROL DEVICE AND VEHICLE WITH AN ELECTRIC CHARGING CONTROL DEVICE

(71) Applicant: Volkswagen Aktiengesellschaft, Wolfsburg (DE)

(72) Inventors: Axel Ulrich, Braunschweig (DE); Christoph Greskamp, Rühen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 5 days.

(21) Appl. No.: 15/988,172

(22) Filed: May 24, 2018

(65) Prior Publication Data

US 2018/0339596 A1 Nov. 29, 2018

(30) Foreign Application Priority Data

May 26, 2017 (DE) ..................... 10 2017 208 895.8

(51) Int. Cl.
*H01M 10/44* (2006.01)
*H01M 10/46* (2006.01)
(Continued)

(52) U.S. Cl.
CPC ............... *B60L 53/60* (2019.02); *B60L 53/16* (2019.02); *B60L 53/00* (2019.02)

(58) Field of Classification Search
CPC ...... B60L 11/1818; B60L 53/00; B60L 53/16; B60L 53/60; B60L 53/10; B60L 53/62;
(Continued)

(56) References Cited

U.S. PATENT DOCUMENTS 8,872,473 B2 10/2014 Song et al.
2010/0121507 A1* 5/2010 Ishii .................. B60K 6/445
701/22
(Continued)

FOREIGN PATENT DOCUMENTS

CN 101772762 A 7/2010
CN 105307894 A 2/2016
(Continued)

OTHER PUBLICATIONS

Search report for German Patent Application No. 10 2017 208 895.8, dated May 24, 2018.
(Continued)

*Primary Examiner* — Edward Tso
(74) *Attorney, Agent, or Firm* — Pearl Cohen Zedek Latzer Baratz LLP

(57) ABSTRACT

The invention relates to a method for operating an electric charging control device (10) of an electric vehicle (11), whereby, in order to charge at least one battery of the electric vehicle (11), a charging cable (19) with a charging plug (20) is plugged into a charging socket (12) that has a charge port door (13) and that is part of the electric charging control device (10), and at least one charging operation is controlled by means of a charging communication chip (17) of the electric charging control device (10). In order to activate (31) the charging communication chip (17), the at least one detection device (14) detects an open/closed state (15) of the charge port door (13) and emits this state in at least one generated detection signal (16), whereby the charging communication chip (17) is activated from a deactivated state (30) when the charge port door (13) is opened.

4 Claims, 2 Drawing Sheets

(51) Int. Cl.
*B60L 53/60* (2019.01)
*B60L 53/16* (2019.01)
*B60L 53/00* (2019.01)

(58) Field of Classification Search
CPC .. B60L 53/66–68; Y02T 90/12; Y02T 90/121; H02J 7/00045; H02J 7/00032; H02J 7/0047
USPC ......................................... 320/109, 104, 155
See application file for complete search history.

(56) References Cited

U.S. PATENT DOCUMENTS

| | | |
|---|---|---|
| 2011/0022264 A1 | 1/2011 | Conan et al. |
| 2012/0083148 A1 | 4/2012 | Hirashita et al. |
| 2013/0079968 A1* | 3/2013 | Crombez ............... B60K 28/10 701/22 |
| 2014/0170879 A1 | 6/2014 | Kahara et al. |
| 2014/0333262 A1* | 11/2014 | Ochiai ................... B60L 53/60 320/109 |
| 2015/0210172 A1 | 7/2015 | Kanayama |
| 2015/0278038 A1* | 10/2015 | Halker ................... G06F 11/20 714/3 |
| 2015/0329002 A1* | 11/2015 | Broecker ............... B60L 58/12 320/109 |
| 2016/0039296 A1 | 2/2016 | Nakamura et al. |
| 2016/0280078 A1* | 9/2016 | Tsukamoto ............ H02J 7/025 |
| 2016/0375782 A1* | 12/2016 | Liu ...................... B60L 11/1844 320/109 |
| 2017/0253135 A1* | 9/2017 | Hourtane ................ B60L 53/14 |

FOREIGN PATENT DOCUMENTS

| | | |
|---|---|---|
| CN | 205632361 U | 10/2016 |
| CN | 106347156 A | 1/2017 |
| DE | 10 210 614 A1 | 10/2003 |
| DE | 10 225 160 A1 | 12/2003 |
| DE | 10 2011 076 451 A1 | 12/2011 |
| DE | 10 2011 056 501 A1 | 6/2013 |
| DE | 10 2015 200 997 A1 | 7/2015 |
| DE | 10 2013 204 633 A1 | 11/2016 |
| DE | 10 2012 109 429 A1 | 10/2017 |
| EP | 0 697 680 A2 | 2/1996 |
| EP | 2 048 762 A1 | 4/2009 |
| EP | 3 024 687 A1 | 6/2016 |
| WO | WO 2011/156776 A2 | 12/2011 |

OTHER PUBLICATIONS

Search report for European Patent Application No. 18172224.0, dated Nov. 12, 2018.
Office Action for Chinese Patent Application No. 201810499936.1, dated Jan. 5, 2021.
Office Action for Chinese Patent Application No. 201810499936.1, dated Jul. 13, 2021.
Office Action for European Patent Application No. 18 172 224.0, dated Jun. 24, 2021.

* cited by examiner

METHOD FOR OPERATING AN ELECTRIC CHARGING CONTROL DEVICE AND VEHICLE WITH AN ELECTRIC CHARGING CONTROL DEVICE

CROSS-REFERENCE TO RELATED APPLICATIONS

This application claims priority from German Patent Application No. 10 2017 208 895.8 filed May 26, 2017, which is hereby incorporated by reference.

FIELD OF THE INVENTION

The invention relates to a method for operating an electric charging control device of an electric vehicle. The invention also relates to an electric vehicle with an electric charging control device.

BACKGROUND OF THE INVENTION

Communication between the vehicle and the charging station is necessary in order to charge the battery of an electric vehicle at a charging station. According to the CCS (Combined Charging System) standard, a charging communication chip, which can be a PLC (Powerline Communication) chip, has to be integrated into the electric vehicle. In order to ensure a prolonged service life of components and to avoid unnecessary electromagnetic interference or EMI that is not in compliance with the standards of electromagnetic compatibility (EMC), the charging communication chip is switched off when it is not needed. In concrete terms, this means that the charging communication chip should be switched off as soon as no charging plug is detected on the electric vehicle, in other words, once there is no longer a connection between the electric vehicle and a charging station via a charging cable. According to the invention, a charging communication chip of the charging control device of the electric vehicle is activated in situations in which the charging communication chip is needed in order to control a charging operation.

German patent application DE 10 2011 056 501 A1 discloses a method for detecting the state of a connection between an electrically powered vehicle and a corresponding charging station. Here, the length of a "control pilot" line between the vehicle and the charging station is measured. This is ascertained by means of a signal propagation time. Therefore, the method detects whether the plug of a line is plugged into the electric vehicle.

German patent application DE 10 2011 076 451 A1 discloses an interlock of a vehicle for preventing damage to a cable assembly used to charge an electric vehicle if the vehicle is driven away while the cable assembly is still plugged in. A cable assembly indicator, which shows whether the cable assembly is connected, can comprise the detection of the plug that is coupled to a socket in the vehicle. A cable assembly indicator can also be a switch, whereby a signal from the switch indicates whether a charge port door of the vehicle is open or closed. The vehicle is disabled if a positive result is detected by a cable assembly indicator while the vehicle is deactivated.

Owing to an initialization time when the charging communication chip is activated, the user encounters a certain waiting time at the start of a charging operation. Only after the charging communication chip has been activated can the user receive feedback about the start of the charging operation, so that he/she has to wait for feedback during the initialization time. If a charging communication chip is continuously activated so that there is no waiting time for the user, however, problems arise in terms of a shorter service life of components or in terms of electromagnetic interference (EMI).

The objective of the invention is to put forward a method for operating an electric charging control device in which a charging communication chip is activated in such a manner that the above-mentioned problems involving a continuous activation are avoided and, at the same time, a user who wishes to charge the electric vehicle can more quickly receive feedback about the start of the charging, thereby reducing the waiting time for the user.

This objective is achieved according to the invention by the independent claims. Advantageous refinements are described in the dependent claims, in the description below as well as in the figures.

SUMMARY OF THE INVENTION

The invention puts forward a method for operating an electric charging control device of an electric vehicle. In this context, an electric vehicle can be a purely electrically operated vehicle with a battery and an electric motor, or it can be a hybrid vehicle that also has an internal combustion engine. The charging control device controls at least one charging operation of a battery of the electric vehicle by means of a charging communication chip. Here, the battery is a battery that supplies electric energy to operate a vehicle's electric motor that powers the vehicle. For a charging operation, a charging cable having a charging plug is inserted into the charging port door of the vehicle. During a charging operation, electric energy from a charging station can be transmitted from a charging station into the battery of the vehicle via the charging cable. The charging socket of the vehicle has a charge port door. When the charge port door is closed, in other words, when the charge port door is not open, the charging socket is protected, that is to say, the charge port door is positioned over the charging socket in such a way that it is especially not accessible from the outside and/or is protected, for example, against weather effects. In contrast, when the charge port door is open, in other words, when the opening is not closed, it is possible to plug the charging plug into the charging socket for a charging operation.

According to the invention, the charging communication chip is activated when the charge port door is opened and the charging communication chip was in the deactivated state at the moment when the charge port door was opened. For example, when the vehicle is operational, for instance, while the vehicle is being driven, the charging communication chip is deactivated. When the user parks the vehicle, e.g., at a charging station and intends to start a charging operation, the user opens the charge port door of the vehicle so as to be able to connect the charging cable. Since the charging communication chip is activated at the moment when the user opens the charge port door, the initialization time of the charging communication chip that is encountered when the charging communication chip is activated coincides with a period of time while the user, for example, is first connecting a charging cable to a connector on the charging station and then to the charging socket of the vehicle. Normally, such a plugging procedure of the charging cable takes longer than the initialization time of the charging communication chip. The advantage here is that, once the user has connected the charging cable to the charging station as well as to the vehicle, he/she can immediately receive feedback, for example, that the charging operation has successfully started. Consequently, the waiting time for the user until he/she receives the appertaining feedback is avoided or at least shortened. The time before feedback from the charging control device is given to the user is thus shorter than the handling time of the user during which he/she is plugging in the charging plug, or at least shorter than if the charging communication chip were only activated once the charging cable had been plugged in.

The opening of the charge port door is detected at least by means of a detection device provided for this purpose. This device indicates the open/closed state of the charge port door by emitting at least one generated detection signal. The detection signal can be used to detect the opening of the charge port door. For example, the detection signal has a first value when the charge port door is in the closed state, whereas it has a second value when the charge port door is in the open state. The charge port door is being opened when the value of the detection signal changes from the first value to the second value. Consequently, the detection signal can be used in order to detect whether the user is opening the charge port door of the vehicle and, at the moment when the user opens the charge port door of the vehicle, the charging communication chip can be activated so that it can control a charging operation anticipated by the user.

The invention also comprises refinements which entail additional advantages.

According to a refinement of the method, the charging communication chip is already activated before the charge port door is opened, once it is detected that a user will presumably carry out a charging operation within a prescribed period of time. For this purpose, the charging communication chip according to the refinement is activated when a radio connection is detected between the vehicle and at least one familiar charging station. If the charging communication chip was in a deactivated state at the time of such a detection, then the charging communication chip is activated. The charging communication chip then remains activated when the charge port door is opened. Thus, a vehicle can be configured in such a way that a radio connection is automatically established with familiar charging stations, that is to say, charging stations where the vehicle has already been charged once before. The radio connection can exist directly between the charging station and, for example, an on-board computer of the vehicle or a mobile phone of a user of the vehicle, whereby the mobile phone is connected to the on-board computer of the vehicle via another radio connection, for example, a Bluetooth connection or a WLAN connection. The prescribed duration can be a period of time within which a user normally starts a charging operation after he/she drives up to a charging station and after the associated radio connection with the charging station is established, for example, one minute or a value that is adapted to the routine of the user. The advantage of this refinement is that the charging communication chip is already activated before the charge port door is opened, thus ensuring that the initialization time of the charging communication chip will have ended, even if the user plugs the charging cable with the charging plug into the charging socket of the vehicle extremely quickly in order to carry out a charging operation after he/she has opened the charge port door, in other words, within a time period that is shorter than the initialization time. In this case as well, this refinement ensures that the user does not encounter a waiting time and he/she immediately receives feedback about the start of the charging operation.

Another refinement of the method likewise provides that the charging communication chip is already activated before the charge port door is opened. In this refinement, the charging communication chip is then activated once it has been detected that the vehicle has parked in a prescribed area. "Parking" is taking place, for example, when the vehicle is being driven at an ever-slower speed into the prescribed area and is brought to a standstill in the prescribed area. The prescribed area can be selected, for example, by a user and this can be an area where the user normally charges the vehicle. For instance, this area is a garage belonging to the user or a parking spot where the user has access to a charging station. The prescribed area can also include several preselected areas where public-access charging stations have been made available. This refinement also entails the advantage that, in any case, a user can receive feedback about the start of a charging operation once he/she has plugged the charging plug into the charging socket of the vehicle, without having to wait until the end of an initialization time or part of an initialization time of the charging communication chip.

A refinement provides that the charging communication chip is activated when a user carries out an appertaining control procedure. In order to do this, the user can employ, for example, an app of a mobile device that is connected to the on-board computer of the vehicle, or he/she can make an appropriate input into an information system of the vehicle, whereby this input is the control procedure to activate the charging communication chip. After an appropriate input, the app of the mobile device or an on-board computer that is connected to the information system of the vehicle generates an activation signal. If the charging communication chip was in the deactivated state, then it is activated by means of the activation signal and it remains activated while the charge port door is being opened. The advantage of this refinement is that a user can actively influence and control the activation of the charging communication chip and he/she can activate the charging communication chip whenever he/she needs it, for example, for a charging operation.

A refinement of the method provides that the charging communication chip is already activated before the charge port door is opened when a remote control key of the electric vehicle is detected on the charge port door side of the electric vehicle. The charge port door side is the side where the charge port door of the vehicle is located or installed. For example, the on-board computer of the vehicle can be configured in such a way that it can detect the position of the remote control key relative to the vehicle, at least so accurately that it detects on which side of the vehicle the remote control key is located. If the user goes to the charge port door side holding the remote control key, it is likely that he/she intends to start a charging operation. According to this refinement, in such a case, if the charging communication chip is in the deactivated state, the charging communication chip is then activated, whereby it remains activated when the charge port door is opened. Here, too, the advantage of the refinement is that the user can receive feedback, even if he/she plugs the charging plug into the charging socket extremely quickly after opening the charge port door.

A refinement of the method provides that the charging communication chip is deactivated again if, once the charging communication chip has been activated, no charging operation is carried out after a prescribed period of time. If, for example, a user opens the charge port door but does not plug in a charging cable and thus does not start or does not intend to start a charging operation, then the charging communication chip will be deactivated after the prescribed period of time. The prescribed duration can be a period of time within which a user would normally have plugged a charging cable into a charging socket of the vehicle. The period of time can be one minute, especially less than a minute. According to this refinement, the charging communication chip is also activated if at first a charging operation was successfully activated and, after the charging operation has been completed, no further charging operation is carried out. In this case, the charging communication chip is thus deactivated if, after a completed charging operation, the prescribed period of time has come to an end. The advantage is that the charging communication chip does not remain activated when it is not needed. This avoids problems such as unnecessary aging phenomena of the charging communication chip or electromagnetic interference in the vehicle by the charging communication chip over an unnecessary period of time.

A refinement of the method provides for the charging communication chip to only remain activated if it is needed for a specific charging operation or a specific type or modality of charging. If the charging operation is carried out employing a charging modality in which there is a need for control by means of the charging communication chip, then the charging communication chip remains activated, at least during the charging operation. Such a first charging modality is, for example, a DC charging operation. In the case of a charging modality in which there is no need for control by means of the charging communication chip, the charging communication chip is deactivated once again after a prescribed period of time, for example, in order to avoid problems involving electromagnetic interference. Such a second charging modality is, for example, an AC charging operation. In this case, the prescribed period of time can be very short, for example, less than two seconds, since after a charging operation has been started employing a second charging modality, it is immediately clear after the start of this charging operation that the charging communication chip is not needed in this situation. The fact that the prescribed period of time is very short entails the advantage that, for example, problems involving electromagnetic interference are minimized.

In a refinement, it is provided for the charging communication chip to be deactivated when the charging port door is being closed, or else the charging communication chip remains in the deactivated state if it had already been deactivated when the charge port door was being closed. For example, immediately after ending the charging operation, for instance, within one second after ending the charging operation, a user can pull the charging plug out of the charging socket and can close the charge port door. This refinement entails the advantage here that the charging communication chip is deactivated again immediately after the end of the charging operation in order to avoid the problems described above. The closing of the charge port door can be expertly recognized by means of the detection signal of the detection device.

The invention also relates to a vehicle with an electric charging control device having a charging communication chip. The vehicle also has a detection device that is configured to detect the open/closed state of a charge port door of the electric charging control device. The detection device is configured to indicate the open/closed state by emitting a corresponding detection signal, whereby the detection signal has, for instance, a first value when the charge port door is closed and a second value when the charge port door is open. A control unit of the vehicle is configured to activate the charging communication chip as a function of the detection signal. For example, the control unit activates the charging communication chip if the latter was in the deactivated state and if the value of the detection signal changes from the first value to the second value.

The invention also includes refinements of the vehicle according to the invention having features of the type already described in conjunction with the refinements of the method according to the invention. For this reason, the appertaining refinements of the vehicle according to the invention are not described again here.

BRIEF DESCRIPTION OF THE DRAWINGS

An example of the invention is described below. The following is shown.

DETAILED DESCRIPTION OF THE INVENTION

Figure 1:
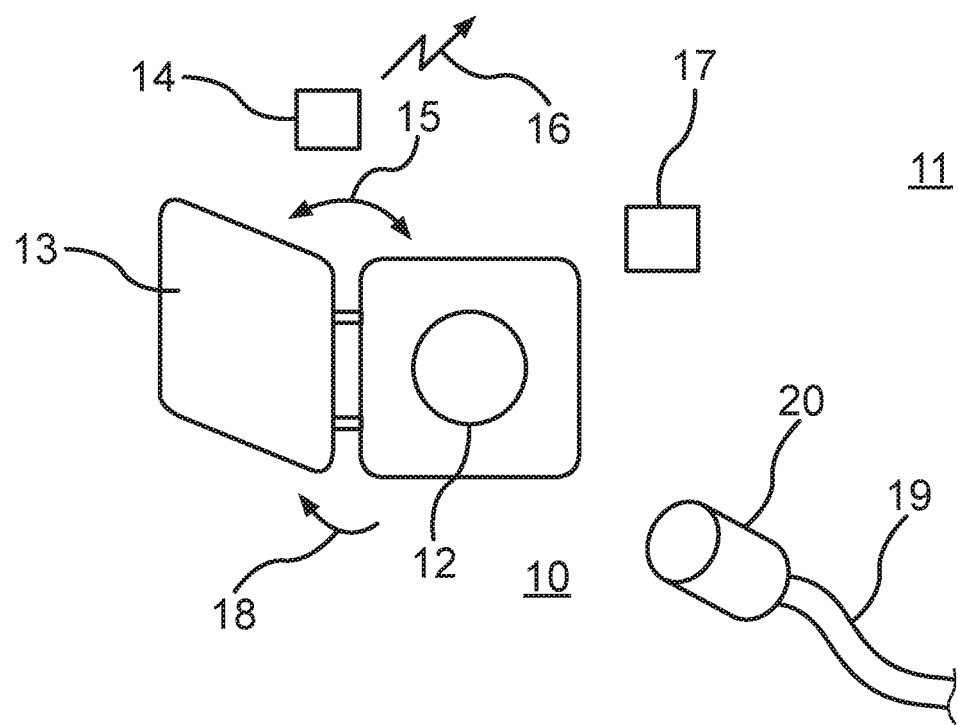
FIG. 1 is a schematic charging control device of a vehicle, having a charge port door.

The examples explained below are each a preferred embodiment of the invention. In the examples, the described components of the embodiment each constitute individual features of the invention that are to be considered independently of each other and they each refine the invention independently of each other and thus also individually or in a combination that is different from the one shown as an integral part of the invention. Moreover, each of the described embodiments can also be augmented by other already described features of the invention.

In the figures, elements with the identical function are provided with the same reference numerals.

FIG. 1 is a schematic view of a charging control device 10 of a vehicle 11. The charging control device 10 has a charging socket 12 with a charge port door 13. A detection device 14 is configured to detect the open/closed state 15 of the charge port door 13 and to indicate this by emitting a detection signal 16. On the basis of the detection signal 16, a charging communication chip 17 of the charging control device 10 can be activated or deactivated. The charge port door 13 is shown in an open state 15 that is attained by opening 18 the charge port door 13. FIG. 1 also shows a charging cable 19 of a charging plug 20.

Figure 2:
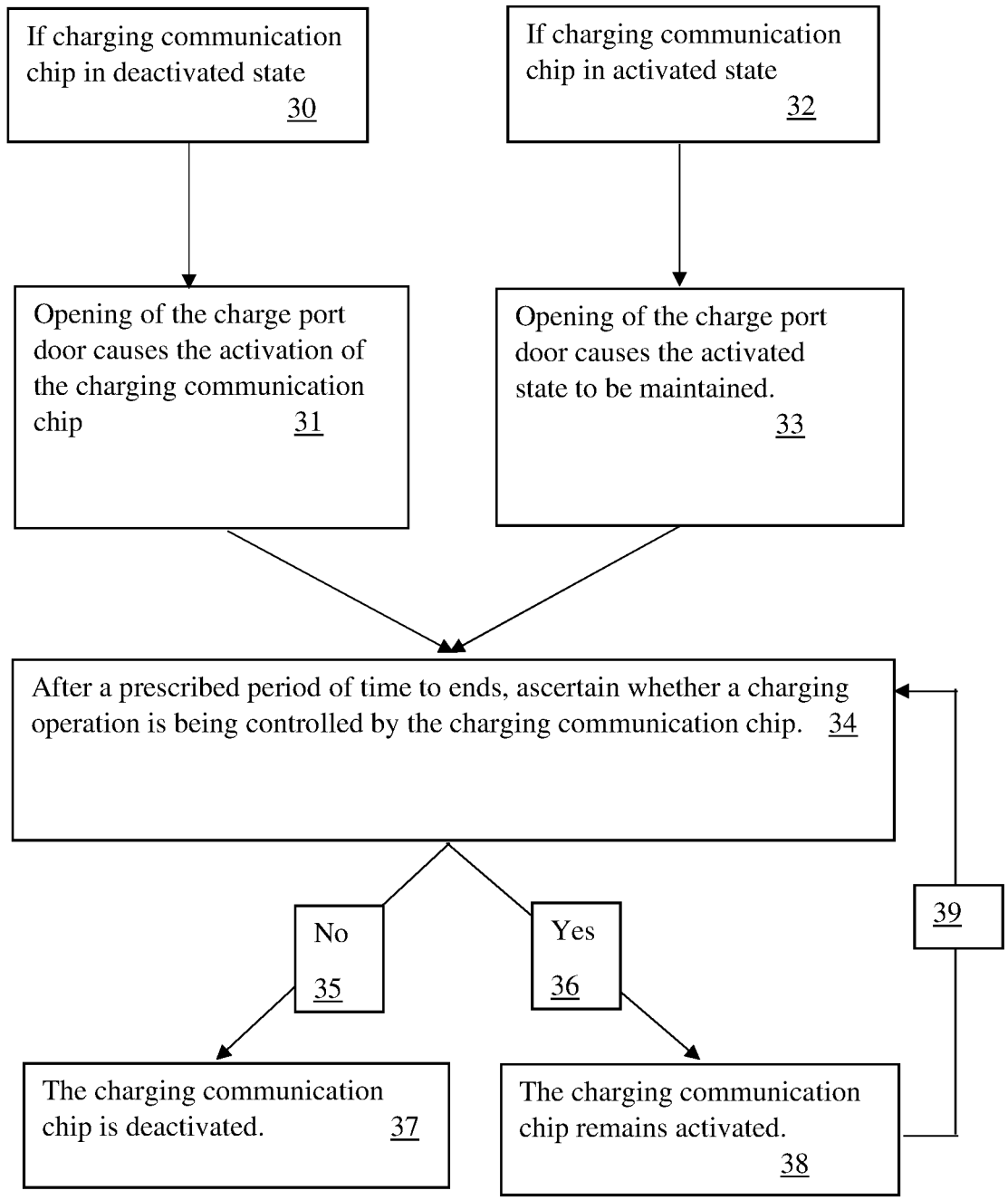
FIG. 2 is a schematic block diagram of the method according to the invention.

FIG. 2 shows a schematic block diagram of the method according to the invention. Here, when the charging communication chip 17 is in the deactivated state 30, the opening 18 of the charge port door 13 causes the activation 31 of the charging communication chip 17. In an activated state 32, the opening 18 of the charge port door 13 causes the activated state 32 to be maintained 33. After the activation 31 or after the activated state 30 is maintained 33, there is a certain waiting time amounting to a prescribed period of time 34, and after the prescribed period of time 34 has ended, a checking procedure ascertains whether a charging operation 35 is being controlled by the charging communication chip 17 or whether the charging communication chip 17 is not being used 36. If it is not being used 36, then the charging communication chip is deactivated 37. In the case of a charging operation 35, the charging communication chip 17 remains 38 activated and the waiting time is repeated 39, for which purpose there is once again a certain waiting time amounting to the prescribed period of time 34.

In one embodiment, a user of the vehicle 11 intends to charge a battery of the vehicle 11. For this purpose, he/she plugs the charging plug 20 of the charging cable 19 of a charging station (not shown here) into the charging socket 12 of the charging control device 10. The charging socket 12 is fitted with the charge port door 13. In an operating state, for example, while the vehicle is being driven, this charge port door is closed in the familiar manner, so that the charging socket 12 is not accessible. In this case, the detection device 14 generates the detection signal 16 that has a first value. Therefore, on the basis of the first value of the detection signal 16, the closed state of the charge port door is known; in other words, in this case, the charge port door 13 is the closed state 15. Consequently, in order to be able to plug the charging plug 20 into the charging socket 12, the user has to open the charge port door 13. At the moment of the opening 18, the detection device 14 detects a new state 15, which is now an open state 15. In this case, the detection signal 16 has, for example, a second value. When the value of the detection signal 16 changes from the first value to the second value, the charging communication chip 17 is activated. Therefore, the charging communication chip 17 is activated when a user—who, for instance, intends to carry out a charging operation—opens the charge port door 13 from a closed state 15 and thus moves it into an open state 15. Therefore, the charging communication chip 17 is activated when the charge port door 13 is opened 18 and not only once the charging plug 20 has been plugged in.

In the schematic block diagram in FIG. 2, it is shown what happens when the charge port door 13 is opened 18 if the charging communication chip 17 is in a deactivated state 30 or in an activated state 32. If the charging communication chip 17 is in a deactivated state 30 when the charge port door 13 is opened 18, then the charging communication chip 17 is activated 31. If the charging communication chip 17 was already in an activated state 32 at the time of the opening 18, this activated state 32 is maintained 33. Thus, in both cases, the charging communication chip 17 is activated after the opening 18 of the charge port door 13. The case in which the charging communication chip 17 is already in an activated state 32 at the time of the opening 18 can occur in that it had already been activated, in that a user had activated it, for example, by means of an operating procedure in a mobile app, or by means of a function of an on-board computer of the vehicle, or else in that the vehicle had automatically made a connection with the charging station that provides the charging cable 19 and its charging plug 20, or else in that the user who would like to carry out the charging operation has taken the remote control key to the side of the vehicle where the charging control device with the charge port door 13 is located.

When the charging communication chip 17 is active, there is a given waiting time amounting to a prescribed period of time 34. This prescribed period of time is, for example, the time that normally lapses after the opening of the charge port door until the user has plugged the charging plug 20 into the charging socket 12 in order to start a charging operation 35. If the charging operation 35 starts within the prescribed period of time 34, the charging communication chip 17 remains 38 activated. If the charging communication chip 17 remains activated, the waiting time is repeated 39 for which purpose, there is once again a certain waiting time amounting to the prescribed period of time 34, resulting in a repetition loop. When the charging operation 35 has been completed after a repetition 39, it is detected that the charging communication chip 17 is not being used 36 and the charging communication chip 17 is deactivated 37. If the charging plug 20 is unplugged from the charging socket 12 after such a deactivation 37 and the charge port door 13 is closed, then the charging communication chip 17 still remains deactivated. It can be activated once again by opening the charge port door 13 again.

The embodiment thus shows how, in order to remedy communication problems, a charging communication chip, for example, a PLC communication chip—which is needed by a vehicle for charging communication with a charging station—is switched off if no charging plug is detected or if a charging operation has been completed. According to the invention, the charging communication chip is intelligently started and initialized before a charging operation. For this purpose, the charging communication chip is activated at an early point in time in that it is activated as soon as a charge port door is opened. The advantage here is that a charging delay due to the relatively long initialization time of the charging communication chip, for example, about 7 seconds, is avoided and the user does not have to wait for these 7 seconds until positive feedback can be provided about the start of the charging. Therefore, as a function of the open/closed state of the charge port door, the charging communication chip is activated or deactivated or a control unit responsible for the charging communication is started, before the charging plug has been plugged in. If, after the charging plug has been plugged in, it is detected that the communication chip is not needed, then the charging communication chip is switched off again, irrespective of the state of the charge port door. However, if the charging communication chip is needed, then the applicable charging operation is started as quickly as possible and a waiting time is avoided. The charging communication chip is thus activated by a charge port door detection that serves as an initial trigger. If the charge port door is detected to be continuously open without a charging plug being plugged into it, the chip is switched off after a defined time-out.

All in all, the example shows how the invention reduces the period of time that exists between plugging in a charging plug for a charging operation and the resultant feedback for a user indicating a successful start of the charging operation. Since a charging communication chip is activated in an intelligent manner already before the start of a charging operation, an unnecessary waiting time for the user is avoided and, at the same time, an unnecessary activity of the charging communication chip is avoided which could lead to aging phenomena in the communication chip or to electromagnetic interference.

LIST OF REFERENCE NUMERALS

10 charging control device
11 vehicle
12 charging socket
13 charge port door
14 detection device
15 open/closed state
16 detection signal
17 charging communication chip
18 opening
19 charging cable
20 charging plug
30 state
31 activation
32 state
33 remaining activated
34 period of time
35 charging operation
36 non-use
37 deactivation 38 maintaining
39 repetition

The invention claimed is:

1. A method for operating an electric charging control device of an electric vehicle, whereby, if in order to charge at least one battery of the electric vehicle, a charging cable with a charging plug is plugged into a charging socket that has a charge port door and that is part of the electric charging control device, at least one charging operation is controlled by a charging communication chip of the electric charging control device, wherein the method comprises:
   when the charging communication chip is in a deactivated state, switching the charging communication chip to an activated state when the charge port door is opened;
   when the charging communication chip is in the deactivated state and before the charge port door is opened, switching the charging communication chip to an activated state when either:
      the vehicle is parked in a prescribed area,
      an activation signal is generated by an app of a mobile device and/or of an on-board computer after a user makes an input, or
      a remote control key of the electric vehicle is detected on a charge port door side of the electric vehicle;
   when the charging communication chip is in the activated state:
      switching the charging communication chip to the deactivated state in response to no charging operation being carried out within a prescribed period of time from when the charging communication chip was switched to the activated state; and
   if the charging operation starts within the prescribed period of time, restarting the prescribed period of time if the charging operation has not been completed, maintaining the activated state if the restarted prescribed period of time has not expired, and, switching the charging communication chip to the deactivated state if the charging operation has been completed after the restarted prescribed period of time has expired.

2. The method according to claim 1, wherein the charging communication chip only maintains the activated state if the charging operation is carried out employing a charging modality in which there is a need for control by the charging communication chip.

3. The method according to claim 1 further comprising, in response to closing the charge port door:
   switching the charging communication chip to the deactivated state if the charging communication chip is in the activated state when the charge port door is closed, or
   maintaining the deactivated state if the charging communication chip is already in the deactivated state when the charge port door is closed.

4. A vehicle with an electric charging control device having:
   a charging communication chip; and
   a detection device to detect the open/closed state of a charge port door of a charging socket of the electric charging control device, whereby the detection device is configured to indicate the open/closed state of the charge port door in a corresponding detection signal,
   wherein, according to the method of claim 1, at least one control device of the vehicle is configured to control an activation of the charging communication chip as a function of the detection signal.

* * * * *